United States Patent
Re Fiorentin et al.

(10) Patent No.: US 8,863,798 B2
(45) Date of Patent: Oct. 21, 2014

(54) AIRLESS VEHICLE TYRE, IN PARTICULAR FOR ROAD VEHICLES

(75) Inventors: Stefano Re Fiorentin, Turin (IT); Giovanni Monfrino, Turin (IT)

(73) Assignee: Fiat Group Automobiles S.p.A. (IT)

( * ) Notice: Subject to any disclaimer, the term of this patent is extended or adjusted under 35 U.S.C. 154(b) by 588 days.

(21) Appl. No.: 13/126,824

(22) PCT Filed: Oct. 31, 2008

(86) PCT No.: PCT/IT2008/000684
§ 371 (c)(1),
(2), (4) Date: Sep. 13, 2011

(87) PCT Pub. No.: WO2010/049963
PCT Pub. Date: May 6, 2010

(65) Prior Publication Data
US 2012/0031536 A1    Feb. 9, 2012

(51) Int. Cl.
*B60C 7/10* (2006.01)
*B60C 7/22* (2006.01)

(52) U.S. Cl.
CPC .... *B60C 7/22* (2013.01); *B60C 7/10* (2013.01)
USPC .......................................................... 152/303

(58) Field of Classification Search
CPC .............. B60C 7/10; B60C 7/102; B60C 7/22
USPC ............ 152/1, 5, 7, 246, 300, 301, 302, 303, 152/305, 209.1
See application file for complete search history.

(56) References Cited

U.S. PATENT DOCUMENTS

| | | | | |
|---|---|---|---|---|
| 1,433,338 A | * | 10/1922 | Bommarius et al. | 152/305 |
| 2006/0144488 A1 | * | 7/2006 | Vannan | 152/7 |
| 2006/0249236 A1 | * | 11/2006 | Moon et al. | 152/246 |

OTHER PUBLICATIONS

International Search Report and Written Opinion mailed Jun. 26, 2009 in corresponding PCT International Application No. PCT/IT2008/000684.

* cited by examiner

*Primary Examiner* — S. Joseph Morano
*Assistant Examiner* — Jean Charleston
(74) *Attorney, Agent, or Firm* — Ostrolenk Faber LLP

(57) ABSTRACT

An airless vehicle tire, in particular for road vehicles, has a tread, which rolls on a road surface, and a reinforcing strip made of elastomeric material and for reinforcing the tread; the reinforcing strip being located inwards of the tread, being connected integrally to the tread, and having a number of adjacent blocks movable with respect to one another, and a circumferential forcing device for exerting force and a circumferential preload on the blocks.

9 Claims, 1 Drawing Sheet

AIRLESS VEHICLE TYRE, IN PARTICULAR FOR ROAD VEHICLES

CROSS-REFERENCE TO RELATED APPLICATIONS

The present application is a 35 U.S.C. §§371 national phase conversion of PCT/IT2008/000684, filed Oct. 31, 2008, the disclosure of which has been incorporated herein by reference. The PCT International Application was published in the English language.

TECHNICAL FIELD

The present invention relates to an airless vehicle tyre, in particular for road vehicles.

BACKGROUND ART

In vehicle tyre manufacturing, an airless tyre is known, from Patent Application WO 2005/082643 filed by the Applicant, comprising an annular body of elastomeric material, in turn comprising a tread which rolls on the road surface, and a tread reinforcing strip made of elastomeric material and placed inwards of the tread. The reinforcing strip comprises a number of blocks which project inwards of the tyre, are arranged contacting one another to withstand circumferential compression on the tyre, taper inwards of the tyre, and are each connected to the adjacent block by a respective virtual hinge. When the tyre tread encounters an obstacle, i.e. a concentrated external load is applied, the virtual hinges oppose minimum resistance to flexing of the reinforcing strip inwards of the tyre, so the blocks around the obstacle rotate in opposite directions to form a number of V-shaped slits, the flare of which varies, depending on the distance from the obstacle, and is maximum at the obstacle itself.

Though widely used, known airless tyres of the above type perform poorly in the presence of obstacles. This is mainly due to the way the reinforcing strip is made, the circumferential action of which varies considerably and locally as the wheel is about to roll over the obstacle. As a result, the contact pressure between the various parts of the tread and the road surface is far from even and homogeneous, as required to achieve optimum grip and long life of the tyre.

Tests show that the contact pressure between the blocks falls at the obstacle, and increases sharply up- and downstream from the obstacle, in two substantially rectangular regions.

DISCLOSURE OF THE INVENTION

It is an object of the present invention to provide an airless vehicle tyre designed to provide a straightforward, low-cost solution to the above problem.

According to the present invention, there is provided an airless vehicle tyre, in particular for road vehicles; the tyre comprising a tread which rolls on a road surface, and a reinforcing strip made of elastomeric material and placed inwards of the tread to reinforce said tread; the reinforcing strip comprising a number of blocks movable with respect to one another; and the tyre being characterized in that said reinforcing strip also comprises forcing means for forcing said blocks against one another to exert a circumferential preload on the blocks.

The forcing means of the tyre as defined above are preferably adjustable forcing means to adjust said circumferential preload.

In the tyre as defined above, at least two consecutive blocks preferably define a gap in between, and said forcing means are housed in said gap.

BRIEF DESCRIPTION OF THE DRAWINGS

A non-limiting embodiment of the invention will be described by way of example with reference to the accompanying drawings, in which.

BEST MODE FOR CARRYING OUT THE INVENTION

Figure 1:
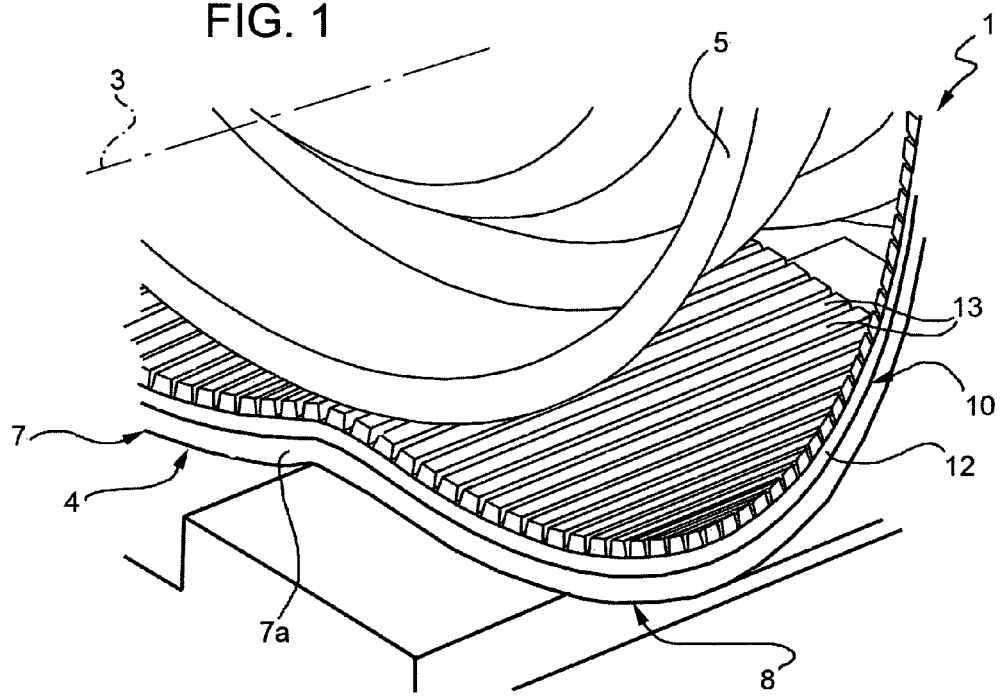
FIG. 1 shows a partial view in perspective of a preferred embodiment of the airless tyre according to the present invention.

Number 1 in FIG. 1 indicates as a whole an airless tyre for a vehicle (not shown), in particular a road vehicle.

Figure 2:
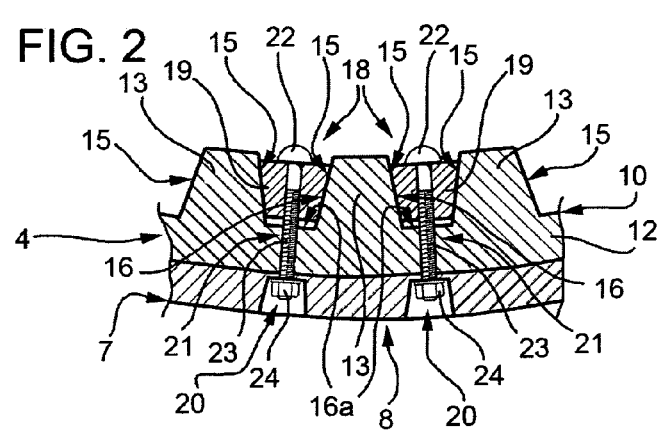
FIG. 2 shows a larger-scale side view of a detail in FIG. 1.
Figure 3:
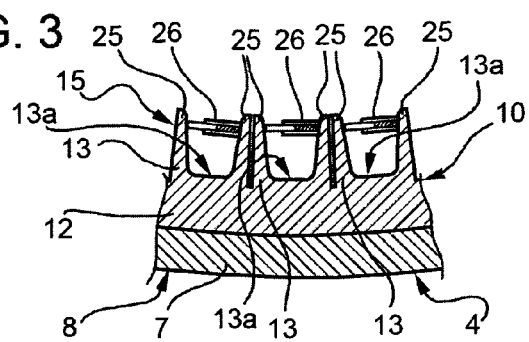
FIG. 3 shows the same view as in FIG. 2, of a variation of a detail in FIG. 2.

Tyre 1, which is designed to support the vehicle without being inflated with compressed air or other fluid, has an axis 3 of rotation, and comprises an annular body 4 made of elastomeric material and which, when not stressed, extends coaxially with axis 3, at a radial distance from a wheel rim 5 (shown schematically). Annular body 4 in turn comprises a tread 7 (FIGS. 1 and 2) bounded externally by a rolling surface 8 which rolls on the road surface; and a tubular reinforcing potion 10 (FIGS. 1-3).

Tubular reinforcing portion 10 is located inwards of tread 7, contacting an inner surface of tread 7, is substantially the same size as tread 7 measured parallel to axis 3, and is of predetermined differential stress resistance, i.e. depending on the stress to which it is subjected. Tubular reinforcing portion 10 conveniently comprises (FIG. 2) a continuous outer annular belt 12 connected integrally in known manner to the inner surface of tread 7, and optionally comprising a number of optionally interlaced reinforcing wires or fibres embedded in the elastomeric material with withstand circumferential stress.

In the example described, tubular reinforcing portion 10 also comprises a ring of solid blocks 13 (FIGS. 1 and 2) connected integrally to belt 12 and projecting towards wheel rim 5 to withstand circumferential compression as tread 7 rolls along.

Blocks 13 extend parallel to axis 3, from one side to the other of annular belt 12 and tread 7, are trapezoidal in cross section, taper inwards of tyre 1 and towards wheel rim 5, and are bounded circumferentially by respective pairs of radial lateral surfaces 15.

With particular reference to FIG. 2, blocks 13 are connected to annular belt 12 in positions spaced circumferentially apart, and the facing lateral surfaces 15 define respective gaps 16 tapering towards annular belt 12.

Blocks 13 are pushed circumferentially against one another and deformed elastically by a forcing device 18 designed to circumferentially compress and preload blocks 13 when no load or when a predetermined minimum load is exerted on tyre 1.

In the example described and illustrated in FIGS. 1 and 2, device 18 comprises, for each gap 16, an elongated wedge-shaped body 19 which is separate from and independent of the other elongated bodies 19, is roughly the same size as but no smaller than respective gap 16, and is pushed inside gap 16, towards a bottom surface 16a of gap 16 and towards annular belt 12, by two or more screw-nut screw assemblies 20. Each assembly 20 comprises a screw 21, the head 22 of which rests on an inner surface of elongated body 19, and the shank 23 of which extends radially through elongated body 19 and belt 12, and projects inside tread 7 where a nut 24 is screwed to shank 23. When forced inside relative gap 16, the sloping lateral walls of each elongated body 19 are forced against the surfaces of relative gap 16, thus elastically deforming blocks 13 and circumferentially preloading the whole ring of blocks 13.

In the FIG. 3 variation, blocks 13 are hollow, and each define an inner radial cavity 13a open, in use, on the side facing wheel rim 5. Each radial cavity 13a is bounded circumferentially by two elastic radial walls 25, and houses an elastic circumferential forcing device 26 shown schematically. Elastic device 26 comprises two hollow portions connected telescopically and housing one or more compression springs (not shown) which exert thrust to part and elastically deform relative walls 25, so the walls 25 of each two adjacent blocks 13 are deformed against each other to circumferentially preload the whole ring of blocks 13.

Regardless of how the ring of blocks 13 is precompressed, forcing in the absence of any load on tyre 1 precompresses and elastically deforms blocks 13 circumferentially, so that, when tyre 1 encounters an obstacle or step, as shown in FIG. 1, the part 7a of tread 7 contacting the obstacle flexes inwards of tyre 1 in proportion to the height and shape of the obstacle. As a result, due to the load transmitted to tread 7, the blocks 13 at the obstacle rotate in opposite directions by an angle varying with the distance from the obstacle, so the free ends of the blocks move further and further apart, and the original circumferential preload is reduced locally in proportion.

Tests show that, even in the presence of an obstacle, the residual circumferential preload on blocks 13 evens out the contact pressure between the road surface and the part of tread 7 contacting the road surface on either side of the obstacle, thus greatly improving grip and, hence, tyre performance and endurance as compared with known solutions.

Clearly, changes may be made to tyre 1 as described herein without, however, departing from the scope defined in the accompanying Claims. In particular, different ways may be provided of forcing wedge-shaped elongated bodies 19 inside respective gaps 16 and/or of circumferentially expanding hollow blocks 13. In the case of solid blocks, a wedge-shaped elongated circumferential forcing body may be provided between only some of the blocks or even only between two adjacent blocks 13. And likewise, in the case of hollow blocks, only some or even only one of the blocks may house an elastic circumferential forcing device 26 of or different from the type shown by way of example, while the other blocks 13 are known types.

Tubular reinforcing portion 10 may even comprise a number of side by side rings of aligned or angularly offset blocks.

The invention claimed is:

1. An airless vehicle tyre, for road vehicles; the tyre comprising a tread which rolls on a road surface, and a reinforcing strip made of elastomeric material and placed inwards of the tread to reinforce said tread; the reinforcing strip comprising a number of blocks movable with respect to one another; and wherein said reinforcing strip also comprises a forcing element configured for forcing said blocks against one another to exert a circumferential preload on the blocks, wherein said forcing element is adjustable to adjust said circumferential preload.

2. An airless vehicle tyre, for road vehicles; the tyre comprising a tread which rolls on a road surface, and a reinforcing strip made of elastomeric material and placed inwards of the tread to reinforce said tread; the reinforcing strip comprising a number of blocks movable with respect to one another; and wherein said reinforcing strip also comprises a forcing element configured for forcing said blocks against one another to exert a circumferential preload on the blocks, wherein at least two consecutive blocks define a gap in between, and said forcing element is housed in said gap.

3. A tyre as claimed in claim 2, wherein said forcing element comprises a wedge-shaped portion housed in said gap; and push means for pushing said wedge-shaped portion towards a circumferential bottom wall of said gap.

4. A tyre as claimed in claim 3, wherein said push means comprise continuous screw adjusting means.

5. A tyre as claimed in claim 4, wherein said screw adjusting means comprise at least a threaded shank extending radially.

6. A tyre as claimed in claim 3, wherein each said block defines a respective said gap with an adjacent block; each of said gaps housing a respective said wedge-shaped portion, which is independent of the other wedge-shaped portions and is moved by respective said push means independent of the other push means.

7. A tyre as claimed in claim 1, wherein said forcing element is an elastic forcing element.

8. An airless vehicle tyre, for road vehicles; the tyre comprising a tread which rolls on a road surface, and a reinforcing strip made of elastomeric material and placed inwards of the tread to reinforce said tread; the reinforcing strip comprising a number of blocks movable with respect to one another; and wherein said reinforcing strip also comprises a forcing element configured for forcing said blocks against one another to exert a circumferential preload on the blocks, wherein at least one of said blocks has a cavity; and said forcing element is housed in said cavity.

9. A tyre as claimed in claim 7, wherein said cavity is a radial cavity bounded circumferentially by two flexible radial walls; said forcing element pushing each said radial wall against an adjacent block.

* * * * *